Feb. 6, 1962 L. J. SCHILLING 3,019,764
MILK RELEASER WITH TIMER CONTROL
Filed March 6, 1958

INVENTOR:
LORELL JOHN SCHILLING
BY
Schroeder, Hofgren, Brady & Wegner
ATT'YS

United States Patent Office 3,019,764
Patented Feb. 6, 1962

3,019,764
MILK RELEASER WITH TIMER CONTROL
Lorell John Schilling, Galesville, Wis., assignor to Schilling Electric Company
Filed Mar. 6, 1958, Ser. No. 719,663
6 Claims. (Cl. 119—14.05)

This invention relates to a novel liquid handling system and more particularly to a system for releasing milk from an evacuated pipeline, incorporating a novel electrical control arrangement.

Carry-away milk handling systems in which the milk is drawn by vacuum through a pipeline from the point of milking to a central collection point are widely used by dairy farmers. In many of these systems it is necessary that the milk be removed or "released" from the evacuated system for further handling or for transfer to an unevacuated storage tank.

A principal object of this invention is the provision of a novel timed control circuit for a milk releaser or similar liquid handling apparatus, as a pump.

One feature of the invention is the provision in a liquid handling system including means for collecting liquid and means actuable for transferring liquid from hte collecting means, of a control system, including means responsive to the quantity of liquid in the collecting means for actuating the transferring means, and a timer responsive to the liquid responsive means for terminating the action of the liquid transferring means, a predetermined period of time after actuation thereof. Another feature is that the liquid responsive means is rendered inoperative during the period of actuation of the liquid transferring means.

A further feature is that the control system includes means responsive to a quantity of liquid in the collecting means for completing a circuit having a timer therein, with switch means responsive to the timer for completing a circuit actuating the liquid transferring means, and second switch means responsive to the timer for rendering the liquid responsive means inoperative.

Yet another feature is the provision of a releaser for an evacuated milk handling system, including a milk receiving chamber, a milk dispensing chamber having an inlet connected with the receiving chamber through a check valve and having an outlet with a check valve, a source of vacuum connected with the dispensing chamber through an electrically actuated valve, a sensing circuit including an electrode extending into the dispensing chamber, the sensing circuit being completed when the milk level therein reaches the electrode, means responsive to completion of the sensing circuit for actuating the valve to break the vacuum connection to the dispensing chamber, and a timer for terminating actuation of the valve after a predetermined period.

Figure 1:
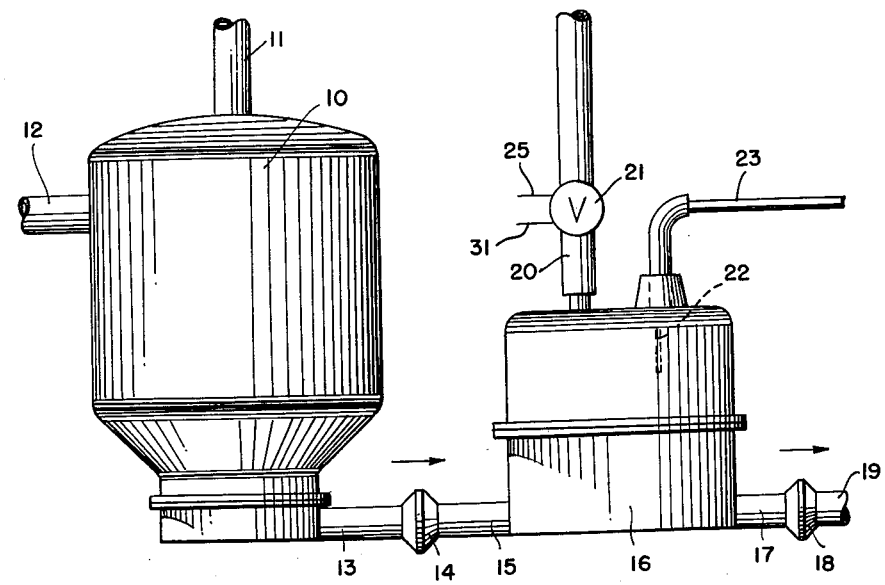
Figure 2:
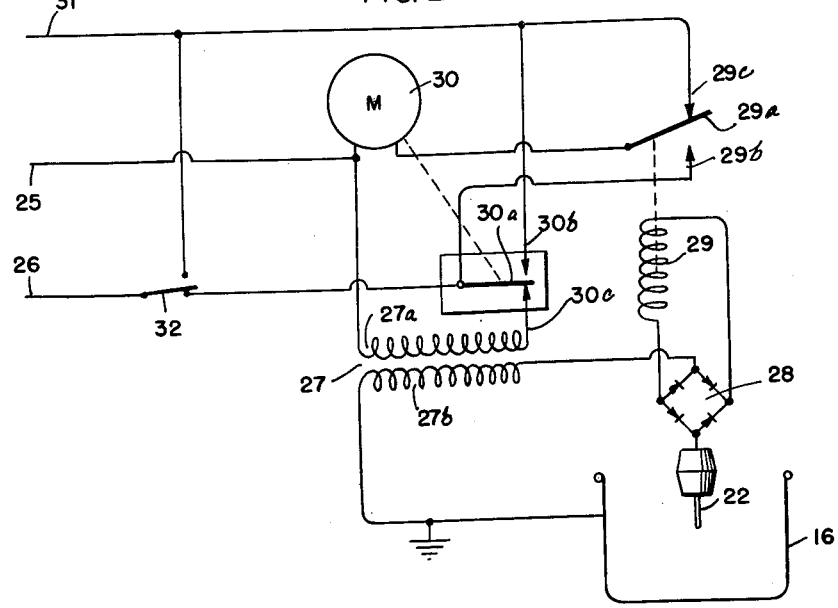

Further features and advantages will readily be apparent from the following specification and from the drawings, in which:

FIGURE 1 is an elevational view, partially diagrammatic, illustrating a milk releaser system embodying the invention; and FIGURE 2 is a schematic diagram of a control circuit therefor.

Most previously known milk releaser systems have utilized either a cyclically operated valving arrangement or a weight actuated valving arrangement for effecting the actual release of the milk. The cyclically operated system periodically releases regardless of the amount of milk to be released, and thus is relatively inefficient. The weight-actuated system requires moving parts in contact with the milk, and it is objectionable from the sanitary standpoint. One electrical control system which has been used incorporates two electrodes in the dispensing chamber, connected into a control circuit. With this system, operation is sometimes falsely triggered by foam. In addition, a film of milk on the surface of the releaser chamber often causes leakage between the electrodes sufficient to trigger operation and resulting in excessive pitting of the electrodes. The present system is designed to eliminate this problem.

Turning now to FIGURE 1, the releaser portion of a milk handling system is illustrated. A milk receiving chamber 10 is connected through a pipe 11 with a source of vacuum (not shown), the vacuum drawing milk through pipeline 12 into the receiving chamber. Outlet 13 at the bottom of receiving chamber 10 is connected through check valve 14 with the inlet 15 of a milk dispensing or releasing chamber 16. An outlet 17 from the dispensing chamber is connected through check valve 18 with pipeline 19, through which the released milk flows to an unevacuated storage tank or further milk handling equipment. Dispensing chamber 16 is connected through hose 20, in which electrically operated valve 21 is interposed, to the source of vacuum. A liquid level measuring electrode 22 extends down into the upper portion of dispenser chamber 16 and is connected through cable 23 with a control circuit.

During operation of the system, milk flows through pipeline 12 into receiving chamber 10 where it collects. While valve 21 is open, its unenergized position, vacuum is likewise applied to dispenser chamber 16 and milk flows through check valve 14 from the receiving chamber into the dispenser chamber. Check valve 18, in the outlet of the dispenser chamber is closed. When the level of milk within chamber 16 reaches the bottom of electrode 22, the "release cycle" is initiated and valve 21 closed, venting chamber 16 to atmosphere. Check valve 14 closes, as a result of the evacuated condition of receiving chamber 10, and the milk in the dispenser chamber flows out through check valve 18 into pipe 19. As will appear below, after a period of time valve 21 opens and the cycle is repeated, so long as milk remains to be released.

Referring now to FIGURE 2 of the drawing, the lines 25 and 26 are connected with a suitable source of power, as 110 volts A.C. The liquid level sensing circuit is energized from a step-down transformer 27, the primary winding 27a of which is connected across lines 25 and 26. The secondary winding 27b of the step-down transformer has one terminal connected with a wall of dispenser chamber 16, as through a common ground connection, and the other terminal connected to a full wave rectifier 28 in series with electrode 22. A direct current relay 29 is connected to the output terminals of rectifier 28.

A direct current relay 29 is used as it is more reliable than most alternating current relays and requires less control current for its operation. However, it is undesirable to pass direct current through the circuit of electrode 22, as it results in pitting of the electrode. Accordingly, the rectifier 28 is connected in series with electrode 22 and is energized only when an alternating current circuit is completed through the electrode and milk in dispenser chamber 16.

When the level of milk in dispenser chamber 16 rises to a point where it touches electrode 22 a circuit is completed through the milk, energizing rectifier 28 and in turn energizing relay 29 reversing the connection of switch 29a associated therewith. A primary energization circuit is completed by movable switch arm 29a through contact 29b connecting timer motor 30 across lines 25 and 26. The initial movement of timer motor 30 reverses the connection of cam switch 30a associated therewith, completing a circuit through contact 30b connecting line 31 with line 26, energizing electrically operated releaser valve 21 which is connected across lines 25 and 31. Timer cam switch 30a is a double-throw switch and its movement closing contact 30b opens a connection to contact 30c in the circuit of the primary winding 27a of the sensing circuit step-down transformer rendering the liquid level sensing circuit inoperative during the releasing cycle of the system. When contact 30c opens, relay 29 is deenergized and movable arm 29a returns to the position shown in the drawing completing a circuit through contact 29c providing a secondary energization circuit for timer motor 30. After the timer has completed its cycle, cam switch 30a is returned to the position shown in the drawing, opening contact 30b and breaking the circuit to the releaser valve 21 and the secondary circuit for the timer motor itself. At the same time, contact 30c is closed readying the liquid level sensing circuit for further operation.

It is important that the milk level sensing circuit be disabled during the releasing cycle to prevent a false actuation of the valve 21 as a result of foam on the milk in the dispenser chamber 16. Relay 29 requires a greater amplitude of current to "pull in," or energize than is required for it to hold in energized position. It is necessary that milk or dense concentrated foam actually contact the electrode 22 to provide the current required for initial energization of the relay. However, after the relay has once been energized, if foam touches the electrode, or a film of milk bridges across to the container, sufficient current is passed to hold the relay in the energized position. For example, the relay may require 5 milliamperes for initial energization, but only 2 milliamperes to maintain it energized. If the sensing circuit were continuously operated, with a lot of foam on the milk, the relay could be held energized continuously by the current through the foam, once it had been energized. This would run the timer motor continuously and keep valve 21 energized even though there was no milk in the dispenser chamber 16. In the circuit of FIGURE 2, the primary of the transformer in the sensing circuit is broken and relay 29 released at the start of each release cycle. This requires that the level of milk, rather than merely foam, rise to the electrode 22 in order to start the next cycle.

Manual switch 32 in line 26 may be operated to energize releaser valve 21 continuously, if this should be desired, as during the releasing of the last milk or a washing operation.

The timer control circuit described above may be used in milk handling systems other than the releaser system shown in the drawings. For example, where the milk is collected in a chamber and pumped out at irregular intervals depending on the rate of collection, the circuit may be used to control the pump, with the electrode sensing the level of milk in the collection chamber.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a liquid handling system including means for collecting liquid and means actuable for transferring said liquid from said collecting means; a control system, comprising: means responsive to a quantity of liquid in said liquid collecting means for completing a circuit; a timer in said circuit; first switch means responsive to said timer for completing a circuit actuating said liquid transferring means and completing a holding circuit for the timer; and second switch means responsive to said timer for rendering said liquid responsive means inoperative during the operation of said liquid transferring means and until substantially all of said liquid has been transferred from said collecting means.

2. In a liquid handling system including means for collecting liquid and means actuable for transferring said liquid from said collecting means; a control system, comprising: means responsive to the quantity of liquid in said liquid collecting means, for completing a circuit; a relay having a double-throw switch associated therewith, connected in said circuit; a timer having a primary energizing circuit completed through the switch associated with said relay when the relay is energized; a double-throw timer switch actuated upon energization of the primary circuit for said timer for movement from a first position completing the energization circuit for said liquid responsive means and a second position completing a circuit for actuating said liquid transferring means and a secondary timer energization circuit through said double-throw relay switch.

3. A releaser for an evacuated milk handling system, comprising: means defining a milk receiving chamber; means defining a milk dispensing chamber having an inlet connected with said receiving chamber through a check valve and having an outlet with a second check valve; a source of vacuum; means including an electrically actuated valve connecting said dispensing chamber with said source of vacuum; a sensing circuit including an electrode extending into said dispensing chamber, said sensing circuit being completed when the milk level in said chamber reaches said electrode; and a timer responsive to completion of said sensing circuit for actuating said electrically operated valve, venting said dispensing chamber for a predetermined period of time.

4. A releaser for an evacuated milk handling system, comprising: means defining a milk receiving chamber; means defining a milk dispensing chamber having an inlet connected with said receiving chamber through a check valve and having an outlet with a check valve; a source of vacuum; means including an electrically actuated valve connecting said dispensing chamber with said source of vacuum; a sensing circuit including an electrode extending into said dispensing chamber, said sensing circuit being completed when the milk level in said chamber reaches said electrode; a timer responsive to completion of said sensing circuit; first switch means responsive to said timer for completing a circuit actuating said electrically operated valve, venting said dispensing chamber for a predetermined period of time; and second switch means responsive to said timer for rendering said sensing circuit inoperative during said period of time.

5. In a liquid handling system including means for collecting liquid and means operable for transferring said liquid from said collecting means; a control system comprising: a timer; means responsive to the quantity of liquid in said collecting means for initiating operation of said transferring means, and connected with said timer for initiating operation thereof; a connection between said timer and said liquid transferring means for terminating the action of the transferring means a predetermined period of time after initiation of operation thereof; and means for rendering said liquid responsive means inoperative during the operation of said liquid transferring means and until substantially all of said liquid has been transferred from said collecting means.

6. The control system of claim 5 wherein a cam on said timer actuates a switch connected in the circuit of said liquid responsive means, rendering the liquid responsive means inoperative during operation of the liquid transferring means and until substantially all of said liquid has been transferred from said collecting means.

References Cited in the file of this patent

UNITED STATES PATENTS

| | | |
|---|---|---|
| 978,923 | Mulligan | Dec. 20, 1910 |
| 2,380,884 | Von Stoeser et al. | July 31, 1945 |
| 2,466,386 | Curoni | Apr. 5, 1949 |
| 2,511,637 | Johannes | June 13, 1950 |
| 2,786,603 | Holmberg et al. | Mar. 26, 1957 |
| 2,867,354 | Tanzola | Jan. 6, 1959 |